Figure 1:
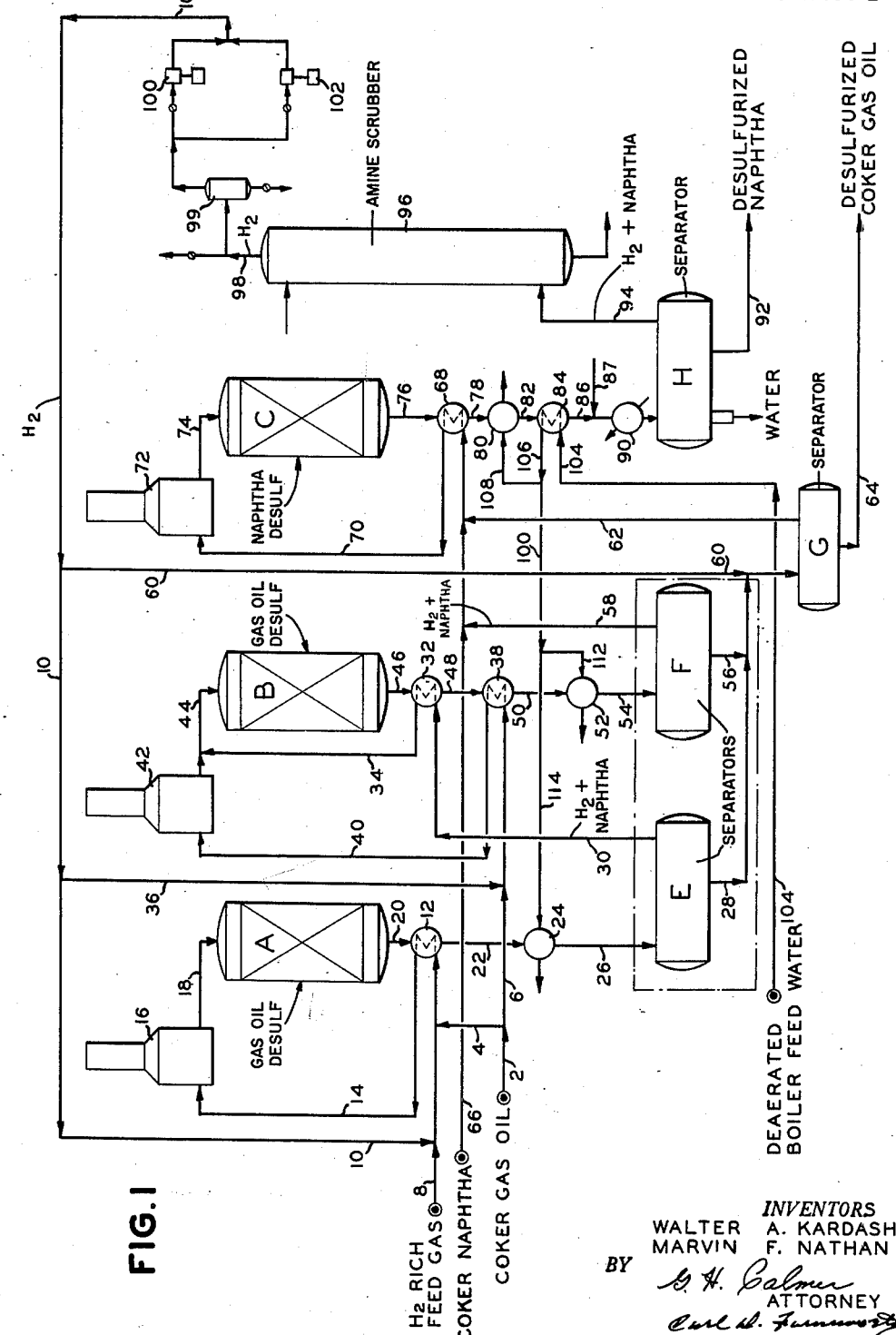

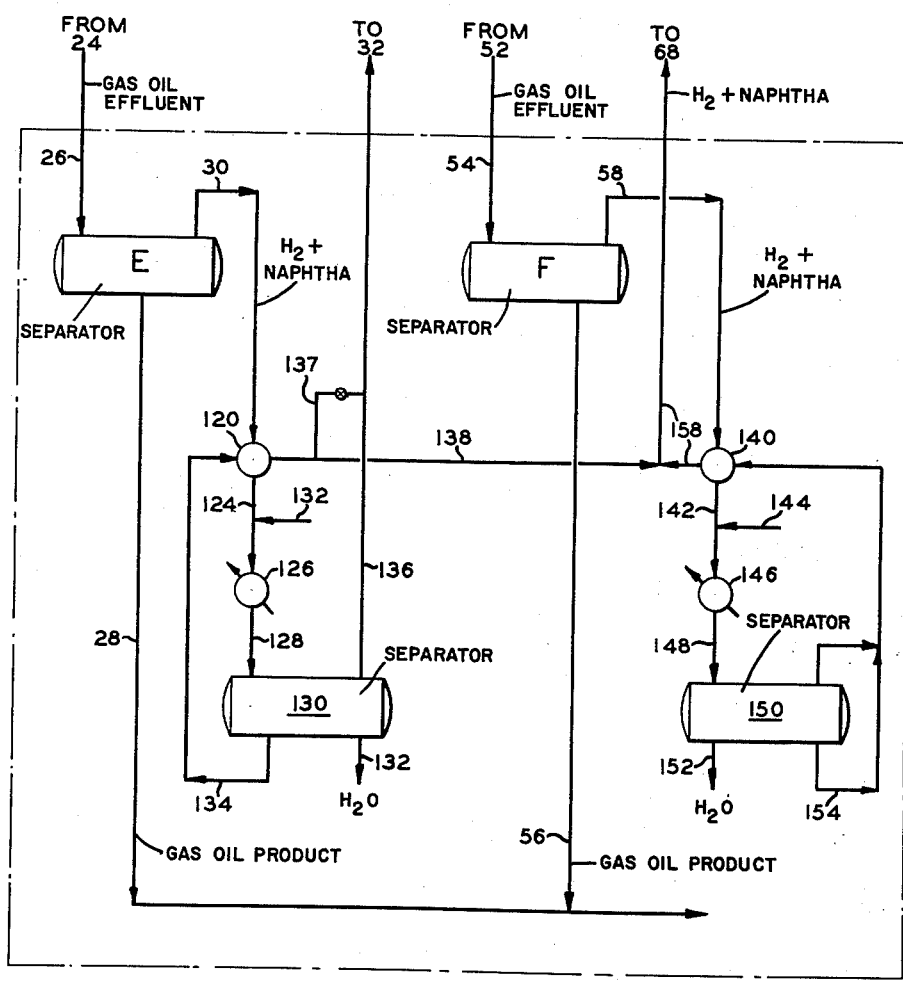

United States Patent Office 3,077,448
Patented Feb. 12, 1963

3,077,448
DESULFURIZATION PROCESS
Walter A. Kardash, Yonkers, and Marvin F. Nathan, New York, N.Y., assignors to The M. W. Kellogg Company, Jersey City, N.J., a corporation of Delaware
Filed May 3, 1960, Ser. No. 26,519
10 Claims. (Cl. 208—210)

This invention relates to a method for treating hydrocarbons in the presence of hydrogen-rich gas. In one aspect the invention relates to an improved method and combination of process steps to effect treatment of at least two dissimilar hydrocarbon feed materials with a hydrogen-rich gas stream and the recovery of desired products from the treating steps.

The art of hydrogenating hydrocarbons and particularly those processes involving hydrofining or catalytically desulfurizing a sulfur-bearing hydrocarbon material in the presence of hydrogen at elevated temperatures up to about 1000° F., and elevated pressures up to about 200 atmospheres is known. Furthermore, many different catalyst compositions have been proposed for effecting such hydrogenating reactions including oxides and sulfides of aluminum, iron, nickel, cobalt, chromium, molybdenum, copper, manganese, tungsten and compounds such as molybdates, thio-molybdates, tungstates and aluminates of metals of the 6th group either alone or on suitable support material and in combination with other promoter catalytic materials. The investment and operating costs of such processes vary considerably and are dependent in large part upon the cost of hydrogen available to the process and its efficient utilization, the process equipment essential for effecting the desired reactions and separation of product constituents of the process. Accordingly, the need for improved and more efficient methods for desulfurizing sulfur-containing hydrocarbon becomes increasingly acute in view of increased operating costs, as well as the increased necessity of treating sulfur-bearing hydrocarbons.

Accordingly, it is an object of this invention to provide an improved combination of process steps for the treatment of hydrocarbon feed materials with hydrogen and the recovery of desired products.

It is another object of this invention to provide an efficient method for desulfurizing dissimilar hydrocarbon feed materials.

Other objects and advantages of this invention will become apparent from the following description.

This invention is directed in one aspect to an improved method and arrangement of process steps employing a plurality of separate reaction zones arranged for sequential flow of varporous material containing hydrogen through the reaction zones with the reaction zones arranged for parallel flow of hydrocarbon reactant materials therethrough. In another aspect there are at least two reaction zones arranged for parallel flow of similar or dissimilar hydrocarbon feed materials with at least one reaction zone arranged in series with at least one other reaction zone to treat hydrocarbon reactant material in conjunction with a portion of the product obtained from another of said series of reaction zones.

In a more specific aspect the present invention is directed to the combination of process steps employed to desulfurize a gas oil feed material boiling in the range of from about 300° F. to about 1000° F., as well as the treatment of a lower boiling hydrocarbon feed material recovered from the product thereof in conjunction with a partially depentanized relatively low-boiling naphtha feed material boiling in the range of from about $C_5$ hydrocarbons to about 380° F. in a separate desulfurization zone. The hydrocarbon feed material treated in accordance with this invention will contain an appreciable amount of sulfur and in some instances will contain appreciable nitrogen. In the practice of this invention a gas oil feed material is passed with hydrogen-rich gas through one or more desulfurization reaction zones under relatively severe desulfurization conditions to effect hydrogeneration of gas oil feed including desulfurization and denitrogenation thereof. When employing at least two desulfurization zones for treating a gas oil feed material in parallel flow arrangement, the product effluent of each desulfurization zone is passed to separate separation zones maintained under elevated temperature and pressure conditions wherein a gas oil fraction is separated and recovered from a hydrogen-rich naphtha fraction. Naphtha boiling range material present in the gas oil feed material, as well as that produced during the relatively severe desulfurization of the gas oil feed is recovered with the hydrogen-rich gas. The hydrogen-rich gas stream containing a major portion of the naphtha is passed sequentially through at least one more desulfurization zone in the series of zones with the relatively low-boiling partially depentanized naphtha feed being passed to the last desulfurization zone of the series and treated with the total naphtha product of the previous desulfurization zone. The gas oil product fraction recovered from the gas oil desulfurization zones and containing a minor amount of naphtha material is passed with a suitable quantity of hydrogen-rich recycle gas to an additional separation zone or stripping zone such as a stripping tower to recover naphtha from the total gas oil fraction with hydrogen-rich gas. The thus stripped or separated naphtha combined with hydrogen-rich gas is then passed to the last desulfurization zone of the series referred to above as the naphtha desulfurization zone. The product effluent of the naphtha desulfurization zone is then separated to recover a hydrogen-rich gas stream from a naphtha product stream. The hydrogen-rich gas stream is treated in a suitable treating step to remove hydrogen sulfide therefrom and the thus treated hydrogen-rich gas is then recycled in parallel flow arrangement to the last of desulfurization zones with make up hydrogen-rich gas being introduced to the first desulfurization zone in the series and sequentially passed through the remaining desulfurization zones of the series. It is contemplated, however, to add hydrogen-rich make up gas to the recycle hydrogen-rich gas passed to any one of the desulfurization zones in the series.

The improved method and arrangement of process steps discussed herein permits the naphtha boiling range material retained with the gas oil feed and any naphtha produced during the gas oil desulfurization step to be treated with hydrogen-rich gas in a plurality of desulfurization zones in order to produce a naphtha product material substantially free of sulfur below about .01 percent by weight and preferably below about .005 percent by weight, as well as a nitrogen content below about 3 p.p.m. (parts per million). In addition, the volume of material handled in a plurality of process steps is held to a desirably low value, thereby contributing to the overall economy and efficiency of the process. In a further embodiment of this invention a major portion of the gas oil feed may be desulfurized in the first of at least two parallel arranged gas oil desulfurization zones with a minor portion of the gas oil feed desulfurized in the second of said parallel arranged zones such that the total hydrogen-rich make up gas may be passed to the first of said parallel arranged desulfurization zones and cascaded to the second. This arrangement permits maintaining the hydrogen concentration of the hydrogen-rich gas at a high value in the series of desulfurization zones with a minimum inventory of hydrogen-rich gaseous material.

One of the important embodiments of the improved method of this invention relates to the combination of process steps employed for the separation and recovery of naphtha from the gas oil product and its subsequent treatment. In accordance with this embodiment the product of the gas oil desulfurization step is separated under elevated pressure conditions in at least two separation zones of decreasing pressure in the direction of vaporous flow through the process, while maintaining elevated temperatures below about 550° F., and preferably below about 500° F. The particular process conditions of temperature and pressure are important since they substantially reduce the need for costly alloys being employed in the process. In this particular arrangement of separation zones a gas oil fraction containing a minor amount of naphtha is recovered as one fraction with the remaining quantity or major portion of the naphtha product being recovered as a separate fraction with hydrogen-rich gaseous material. As hereinbefore discussed the naphtha hydrogen-rich fraction is passed sequentially through the remaining desulfurization zones in the series, thereby subjecting the naphtha to a plurality of relatively severe treating steps. The desulfurized gas oil product containing a minor amount of naphtha is passed as a combined stream with hydrogen-rich gas to an additional separation zone such as a stripping zone maintained under elevated temperature and pressure conditions, but below the pressure in the last gas oil separation zone in the series and above the pressure maintained in the naphtha desulfurization zone. Naphtha material stripped from the gas oil with hydrogen-rich recycle gas is then passed without further compression to the last of the desulfurization zones in the series. By employing this latter arrangement of process steps, the size of the necessary equipment is minimized and use of costly alloys in the separation and stripping equipment is substantially reduced, thereby contributing to the overall efficiency and economy of the process.

In another embodiment of this invention the naphtha hydrogen-rich gas fraction separated from the desulfurized gas oil product of each gas oil desulfurization zone is subjected to further separation treatment in a separate zone to recover a hydrogen-rich gas fraction from a naphtha-rich fraction. That is, in this particular embodiment the naphtha hydrogen-rich gas recovered from the gas oil separation zone is cooled, mixed with water and passed to a second lower temperature separation zone wherein a hydrogen-rich gas stream is separated from a naphtha stream. The addition of water effects partial cooling of the naphtha hydrogen-rich stream and in addition effectively absorbs water soluble constituents such as water soluble nitrogen compounds in the naphtha hydrogen-rich gas stream. The hydrogen-rich gas stream separated from the naphtha stream is then cascaded to the next desulfurization zone in the series of zones. The naphtha-rich stream is then passed to the last desulfurization zone in the series for further treatment with hydrogen-rich gas as hereinbefore discussed. The improved process of this invention provides an arrangement of steps which may be readily adapted for the treatment of hydrocarbon feed materials with hydrogen under a wide variety of process conditions including space velocity, temperature, pressure and ratio of hydrogen to hydrocarbon feed material. That is, reaction temperatures may be employed in the range of from about 600° F. to about 900° F., preferably from about 700° F., to about 800° F., and pressures in the range of from about 400 to about 1200 p.s.i.g., preferably from about 600 to about 900 p.s.i.g. Space velocity conditions may be employed under a relatively wide range of from about 0.5 to about 10 with more severe conditions being imposed when employing space velocities in the range of from about 0.5 to about 5. The ratio of hydrogen circulated to hydrocarbon feed may be in the range of from about 0.5 to about 10 mols of hydrogen per mol of hydrocarbon, thereby maintaining a relatively high concentration of hydrogen in the system, which not only minimizes the volume or inventory of hydrogen-rich gas required in the process, but facilitates maintaining a high hydrogen partial pressure at the reactor outlet above about 240 p.s.i.a., and contributes to the efficient operation and utilization of the individual process steps. The desulfurization reaction may be effected in the presence of a wide variety of catalysts such as chromium-molybdenum-trioxide, nickel-molybdate supported on alumina, nickel-tungsten-alumina, cobalt-molybdate-alumina and nickel-cobalt-molybdate catalysts. That is, the catalytic material may be any suitable desulfurization catalyst including those which are hydrogenating catalysts, such that the sulfur impurities are either adsorbed by the catalyst and/or hydrogenated to produce hydrogen sulfide which is evolved as a product of the process. Catalysts which may be used for the purpose of this invention include for example, a group VI metal compound including the oxides and/or sulfides of the left hand elements thereof, specifically chromia and/or molybdenum trioxide supported on alumina, silica-alumina or other well known carrier materials, or the group VI metal compounds may be promoted with a compound of a metal of group VIII such as the oxides and/or sulfides of iron, cobalt and nickel.

Hydrocarbon feed materials which may be desulfurized in the process of this invention include those referred to as straight run hydrocarbons or hydrocarbon products of cracking operations which include gasoline, naphtha, kerosene, gas oil, cycle stocks from catalytic cracking or thermal cracking operations, residual oils, thermal and coker distillates. These also include those special cuts of either straight run or catalytically cracked products which are referred to as naphtha, cycle oils, stove oils, diesel fuels, etc. The sulfur content of these hydrocarbons may vary over a relatively wide range of from about 0.03 to about 10 percent by weight, more usually the sulfur content will be in the range of from about 0.25 to about 6 percent by weight.

Having thus generally described the improved method and process of this invention, reference is now had by way of example to FIGURE 1 which presents one method of operation.

FIGURE 1 discloses a process flow arrangement employing a plurality of suitably connected desulfurization zones A, B and C provided with a plurality of separation zones E, F, G and H. A coker gas oil boiling in the range of from about 360° F. to about 900° F., having a gravity of about 21.6° API and containing about 3.4 percent by weight sulfur is introduced to the process by conduit 2, separated into two streams comprising a major gas oil stream in conduit 4 and a minor gas oil stream in conduit 6. The major gas oil stream in conduit 4 is combined with the total hydrogen-rich make up gas of about 95 percent hydrogen introduced to the process by conduit 8 and hydrogen-rich recycle gas in conduit 10 of about 78.6 percent hydrogen. The combined gas oil and hydrogen-rich gas stream in conduit 4 is then passed through indirect heat exchanger 12 positioned in the product effluent stream of desulfurization zone A wherein the gas oil stream is indirectly heated to a temperature of about 595° F. The thus preheated gas oil stream and hydrogen is then passed by conduit 14 to furnace 16 wherein the stream is further heated to an elevated temperature of about 635° F. before passage by conduit 18 to desulfurization zone A. In desulfurization zone A relatively severe conditions are employed to effect desulfurization and denitrogenation of a gas oil in the presence of a cobalt-molybdenum desulfurization catalyst with the pressure employed being sufficient to maintain a hydrogen partial pressure of about 600 p.s.i.a. at the reactor outlet. The reactor effluent of zone A is then passed by conduit 20 to heat exchanger 12 where the effluent is cooled to about 540° F. The thus cooled effluent is then passed by conduit 22 to exchanger 24 wherein the effluent is further indirectly cooled in indirect heat exchange with boiler feed water and thereafter passed to separator drum E by conduit 26 to maintain a temperature of about 500° F. in separator drum E and an elevated pressure of about 840 p.s.i.g. In separator drum E the temperature and pressure conditions are selected to effect separation of desulfurized gas oil from a naphtha fraction containing hydrogen-rich gas. As a result of the temperature and pressure conditions employed in drum E a relatively small amount of naphtha is retained in the desulfurized gas oil and is withdrawn therewith from the bottom of the separator drum E by conduit 28 for further treatment as hereinafter described. The separated naphtha fraction substantially free of gas oil is withdrawn with hydrogen-rich gas containing hydrogen sulfide from separator drum E and passed by conduit 30 to indirect heat exchanger 32 in the product effluent stream of desulfurization zone B. In indirect heat exchange zone 32 the naphtha stream and hydrogen-rich gas is reheated to an elevated temperature of about 680° F. for direct passage therefrom by conduit 34 to the inlet of desulfurization zone B. In desulfurization zone B a minor portion of the gas oil is desulfurized in the presence of the naphtha material recovered from desulfurization zone A and separation drum E. Accordingly, the gas oil in conduit 6 amounting to a minor portion of the total gas oil feed is combined with hydrogen-rich recycle gas in conduit 36 and passed to indirect heat exchanger 38 wherein the temperature of the combined stream is raised to about 640° F. The thus heated stream is then passed by conduit 40 to furnace 42 wherein the gas oil hydrogen-rich gas stream is further heated to an elevated temperature of about 695° F. before being passed by conduit 44 in admixture with the naphtha stream in conduit 34 to desulfurization zone B. In desulfurization zone B relatively severe conditions similar to those employed in zone A are employed in the presence of a cobalt-molybdate-alumina desulfurization catalyst to effect desulfurization and denitrogenation of the gas oil and naphtha hydrocarbon material passed to the zone. The product effluent of desulfurization zone B is passed by conduit 46 to indirect heat exchanger 32 and conduit 48 to indirect heat exchanger 38 to effect cooling of the effluent stream to about 550° F. The thus cooled effluent stream is then passed by conduit 50 to exchanger 52 wherein the product effluent is further cooled by indirect heat exchange with boiler feed water for passage by conduit 54 to maintain a temperature of about 500° F. in separator drum F. In separator drum F, temperature and pressure conditions are maintained to separate and recover by conduit 56 a desulfurizing gas oil fraction containing a relatively small amount of naphtha from a major naphtha fraction containing hydrogen-rich gas and hydrogen sulfide, which is removed by conduit 58. The separated gas oil fraction containing naphtha is withdrawn from the bottom of drum F by conduit 56 and is combined with the gas oil in conduit 28, mixed with a sufficient quantity of hydrogen-rich recycle gas in conduit 60 and passed to a third separation zone or stripping zone to recover naphtha in the gas oil fractions recovered from separation zones E and F. The thus separated and/or stripped naphtha is removed from zone G by conduit 62 with the total desulfurized gas oil product substantially free of naphtha boiling range material being removed from zone G by conduit 64. The naphtha fraction and hydrogen-rich gas recovered from zones F and G by conduits 58 and 62 are combined with a coker naphtha feed material (51.9° API) introduced to the process by conduit 66 and passed to indirect heat exchanger 68 in the product effluent stream of desulfurization zone C. It is to be noted at this time that the hydrogen-rich recycle gas employed to strip naphtha from the gas oil in zone G combined with the total hydrogen-rich gas carried out with the naphtha stream from separation drum F is sufficient to provide the necessary hydrogen concentration in desulfurization zone C. Therefore, the hydrogen-rich gas in conduit 60 performs a dual function of stripping naphtha from the gas oil product, as well as providing a portion of the hydrogen requirements in desulfurization zone C. The naphtha and hydrogen-rich gas stream is removed from heat exchanger 68 at a temperature of about 630° F. and passed by conduit 70 to furnace 72 wherein the naphtha hydrogen stream is further heated to an elevated temperature of about 670° F. The thus heated naphtha-hydrogen gas stream is passed by conduit 74 to desulfurization zone C wherein it is maintained in the presence of a desulfurization catalyst under sufficiently severe conditions to desulfurize and denitrogenate the naphtha material passed thereto. The product effluent of desulfurization zone C is passed by conduit 76 to heat exchanger 68, conduit 78 to heat exchanger 80, conduit 82 to heat exchanger 84, conduit 86 to cooler 88 and conduit 90 to separator drum H. In this sequence of heat exchange zones the product effluent of the desulfurization zone C is employed to preheat the naphtha feed to zone C, as well as to give up heat to boiling feed water in exchangers 80 and 84.

The partially cooled product effluent at a temperature of about 387° F. in conduit 87 is mixed with water introduced by conduit 87 to remove salts contained therein and the mixture is then passed through cooler 88 and conduit 90 to separator drum H maintained at a temperature of about 100° F. In separator drum H the product effluent is separated into a gaseous stream containing hydrogen and hydrogen sulfide, a desulfurized naphtha fraction and a water fraction. The desulfurized naphtha fraction is withdrawn from separator drum H by conduit 92 with the gaseous stream containing hydrogen being withdrawn by conduit 94. Provisions are also made for recovering water from the bottom of separator drum H. The desulfurized naphtha in conduit 92 is passed to suitable recovery equipment for further treatment as required in the refinery to which this process is a part of. The gaseous stream containing hydrogen is passed by conduit 94 to an amine scrubber 96 wherein hydrogen sulfide is removed from the hydrogen-rich gas stream. A hydrogen-rich gas stream substantially free of hydrogen-sulfide is recovered from scrubber 96 by conduit 98, passed through a suitable dry drum or knock out drum 99 and then to compressors 100 and 102 wherein the hydrogen-rich gas stream containing about 78.6 percent hydrogen is compressed to a sufficiently elevated pressure for recycle to the process by conduits 10, 36 and 60, as hereinbefore discussed. To facilitate flow of reactant materials through the process and desulfurization zones A, B and C in conjunction with separation zones E, F, G and H, the zones are maintained at a decreased pressure in the direction of flow of reactant materials therethrough with zone H being at the lowest pressure and zone G being at a pressure intermediate the pressure maintained in zones F and H. To facilitate operation of the above described process and to aid flexibility in its method of operation, exchangers 24, 52, 80 and 84 are separately controlled steam boilers provided in the reaction zone effluent streams. That is, deaerated boiler feed water is introduced to the process by conduit 104 and passed to heat exchanger 84, thereby heating the feed water to a temperature of about 382° F. and reducing the temperature of the reaction zone C effluent in conduit 86 to about 387° F. The feed water is recovered from exchanger 84 by conduit 106 and separated into two streams or portions with one portion being passed by conduit 108 to exchanger 80 which reduces the temperature of the reaction zone effluent in conduit 82 to about 415° F. The boiler feed water in conduit 110 is further separated such that a portion of this stream may be passed by conduit 112 to exchanger 52 with the remaining portion being passed by conduit 114 to exchanger 24. In this specific example about 88 g.p.m. (gallons per minute) of feed water is passed by conduit 108 to exchanger 80, 32.4 g.p.m. by conduit 112 to exchanger 52 and about 22.4 g.p.m. by conduit 114 to exchanger 24.

FIGURE 2 presents a modification of FIGURE 1 wherein the hydrogen-rich naphtha fraction separated from the gas oil fractions in separators E and F are subjected to further separate treatment with water to remove water soluble nitrogen constituents and thereafter cascaded to the next desulfurization zone. In one embodiment of FIGURE 2 the hydrogen-rich naphtha stream recovered from separator E is further separated such that a hydrogen-rich gas stream is recovered and cascaded sequentially through the series of desulfurization zones with a naphtha fraction recovered from the hydrogen-rich gas fraction being passed to the last desulfurization zone in the series. More specifically, FIGURE 2 shows separation zone E maintained under elevated temperature and pressure conditions as described with respect to FIGURE 1 to effect separation of a gas oil fraction withdrawn by conduit 28 from a hydrogen-rich naphtha fraction withdrawn by conduit 30. The hydrogen-rich naphtha fraction in conduit 30 is subjected to further treatment to remove ammonia therefrom by cooling the hydrogen-rich naphtha stream in heat exchanger 120 to a temperature of about 225° F., mixing the thus cooled naphtha stream with water introduced by conduit 122 and passing the mixture by conduit 124 to cooler 126 to effect further cooling of the mixture to a suitable temperature to maintain separation drum 130 at a temperature of about 150° F. The mixture of naphtha hydrogen-rich gas and water is passed from cooler 126 by conduit 128 to separation zone 130. In separation zone 130 a water condensate fraction is separated and withdrawn by conduit 132 with a naphtha rich fraction being withdrawn by conduit 134 and a hydrogen-rich gaseous fraction being withdrawn by conduit 136. In one embodiment of FIGURE 2 the separated hydrogen-rich gaseous fraction may be passed alone by conduit 136 to heat exchanger 32 as shown in FIGURE 1 for cascading of the hydrogen-rich gas to the next desulfurization zone in the series or the naphtha fraction in conduit 134 may be combined after suitable heating in exchanger 120 with the hydrogen-rich gaseous fraction in conduit 136 by the bypass provided and cascaded with the hydrogen-rich gas to the next desulfurization zone in the series of zones. When the naphtha-rich fraction in conduit 134 is not to be cascaded sequentially through the desulfurization zones with the hydrogen-rich gaseous fraction then the naphtha fraction, after suitable heating in heat exchanger 120 to a temperature of about 430° F., is passed by conduit 138 and conduit 158 with an additional hydrogen-rich naphtha fraction to heat exchanger 68 shown in FIGURE 1 for further treatment in the last desulfurization zone in the series as described in FIGURE 1. In separator drum F a hydrogen-rich naphtha stream is withdrawn by conduit 58, more specifically described in FIGURE 1, and thereafter, in this particular embodiment of FIGURE 2, is subjected to a water wash treatment to remove ammonia therefrom. That is, the hydrogen-rich naphtha stream in conduit 58 is cooled to a temperature of about 225° F. in cooler 140. The thus cooled naphtha-hydrogen stream is then passed by conduit 142 with water introduced by conduit 144 to cooler 146 and then by conduit 148 to separation zone 150 maintained at a temperature of about 150° F. In separation zone 150 a water condensate fraction is recovered and withdrawn by conduit 152 with a naphtha-rich fraction being separated and recovered by conduit 154 and a hydrogen-rich gas fraction recovered by conduit 156. The hydrogen-rich gas in conduit 156 is combined with the naphtha fraction in conduit 154 and passed to heat exchanger 140 wherein the temperature of the stream is elevated to a suitable temperature for passage to exchanger 68, either with or without the naphtha material in conduit 138 as hereinbefore described. In any of these embodiments the naphtha boiling range material in the gas oil feed material is subjected to at least two separate desulfurization steps ultimately being finally treated in the last desulfurization zone in the series of zones, as discussed herein. In the process of FIGURE 2 the gas oil fractions in conduits 28 and 56 are combined and further treated as discussed herein to recover naphtha contained in the gas oil which is passed to the last desulfurization zone in the series of zones.

Having thus given a description of the invention and provided specific examples thereof, it is to be understood that no undue limitations or restrictions are to be imposed by reason thereof.

We claim:

1. A method for desulfurizing dissimilar hydrocarbon feed materials in a plurality of desulfurization zones which comprises passing a first hydrocarbon feed material admixed with substantially all of the hydrogen-rich make up gas added to the process hereinafter described in contact with a desulfurization catalyst in at least one first desulfurization zone maintained under elevated temperature and pressure desulfurizing conditions, recovering a first product effluent from said first desulfurization zone, cooling said first product effluent and passing said cooled first product effluent to a first separation zone maintained at a temperature not substantially above about 500° F., in said first separation zone separating the first product effluent and recovering therefrom a first hydrogen-rich gaseous stream and a first liquid hydrocarbon product stream, passing the thus separated hydrogen-rich gaseous material with a second hydrocarbon feed material in contact with a desulfurization catalyst in a second desulfurization zone maintained under elevated temperature and pressure conditions, recovering a second product effluent from said second desulfurization zone, cooling said second product effluent and separating into a second hydrogen-rich gaseous stream from a second liquid hydrocarbon product stream, recovering and treating said second hydrogen-rich gaseous stream to remove hydrogen sulfide therefrom and recycling a portion of the thus treated second hydrogen-rich gaseous stream to each of said desulfurization zones, passing another portion of said treated second hydrogen-rich gaseous stream with said first liquid hydrocarbon product stream to an additional separation zone to recover a relatively low-boiling hydrocarbon fraction from a third liquid hydrocarbon product, recovering said third liquid hydrocarbon product and passing the thus recovered relatively low-boiling hydrocarbon fraction to said second desulfurization zone.

2. A process for desulfurizing hydrocarbon feed materials of different boiling range which comprises passing a first high boiling hydrocarbon feed material with hydrogen-rich gas in parallel flow arrangement through at least two desulfurizing zones maintained under desulfurizing conditions, passing a second low boiling hydrocarbon feed material with hydrogen-rich gas through at least one other desulfurizing zone maintained under desulfurizing conditions, said desulfurizing zones arranged for sequential flow of gaseous material therethrough, separating the product effluent of each of said parallel flow arranged desulfurizing zones and recovering a hydrogen-rich gaseous fraction containing a relatively low-boiling hydrocarbon fraction from a higher boiling hydrocarbon product fraction, sequentially cascading said hydrogen-rich gaseous fraction containing said relatively low-boiling hydrocarbon fraction sequentially through said desulfurizing zones, separating the product effluent obtained from desulfurizing said second hydrocarbon feed material and recovering a hydrogen-rich gaseous fraction containing hydrogen sulfide from a hydrocarbon product fraction of said second hydrocarbon feed and said cascaded relatively low-boiling hydrocarbon fraction, removing hydrogen sulfide from said recovered hydrogen-rich gaseous fraction and thereafter recycling the thus treated hydrogen-rich gaseous fraction in parallel flow arrangement to each of said desulfurizing zones.

3. The process of claim 2 wherein all hydrogen-rich make up gas added to the process is introduced to one of said desulfurizing zones arranged for parallel flow of said first hydrocarbon feed material.

4. The process of claim 2 wherein the hydrogen-rich gaseous fraction obtained from the product effluent of said first hydrocarbon feed material is washed with water to remove water soluble constituents therefrom and the thus treated hydrogen-rich gaseous fraction is thereafter cascaded to another desulfurizing zone.

5. The process of claim 2 wherein the hydrogen-rich gaseous fraction containing a relatively low-boiling hydrocarbon material is cooled and separated so that separated hydrogen-rich gas is cascaded to the next desulfurizing zone in the series of desulfurizing zones and separated relatively low-boiling hydrocarbon material is passed to the desulfurizing zone treating the second hydrocarbon feed material.

6. The process of claim 2 wherein the high-boiling fraction separated from the product effluent of each of said parallel flow arranged desulfurizing zones is combined and stripped with hydrogen-rich recycle gas in a stripping zone to recover a relatively low-boiling hydrocarbon fraction from a higher boiling hydrocarbon fraction and the thus recovered relatively low-boiling hydrocarbon fraction being passed to the desulfurizing zone treating the second hydrocarbon feed material.

7. The process of claim 3 wherein a major portion of said first hydrocarbon feed material is passed with all of said hydrogen-rich make up gas to the first of said parallel flow arranged desulfurizing zones.

8. A method for desulfurizing hydrocarbons which comprises passing a first relatively high-boiling coker gas oil hydrocarbon feed with hydrogen-rich gas in parallel flow arrangement to a first and second desulfurization zone, recovering product effluent from each of said first and second desulfurization zone, separately separating the product effluent recovered from said first and second desulfurization zones and recovering a vaporous stream from a liquid stream, passing the vaporous stream recovered from the effluent of said first desulfurization zone with recycle hydrogen containing gases to said second desulfurization zone, combining the recovered liquid stream separated from said first and second desulfurization zone effluents, combining the vaporous stream recovered from the effluent of said coker naphtha desulfurization zone with a second hydrocarbon feed and recycle hydrogen-containing gases, passing the thus combined stream to a third desulfurization zone, recovering a product effluent from said third desulfurization zone, separating the product effluent of said third desulfurization zone into a hydrogen-containing gaseous stream and a liquid naphtha product stream, recovering the liquid naphtha product stream and recycling hydrogen-containing gases to each of said desulfurization zones.

9. The method of claim 8 wherein the combined liquid stream recovered from the product effluent of the first and second desulfurization zones is stripped with hydrogen-rich gas, the hydrogen-rich gas containing stripped material is combined with the second hydrocarbon feed passed to the third desulfurization zone and a stripped gas oil product is recovered.

10. The method of claim 8 wherein the hydrocarbon feed and hydrogen-rich gas passed to each desulfurization zone is first preheated by indirect heat exchange with the product effluent of the desulfurization zone to which it is to be passed and make-up hydrogen-rich gas is introduced to the first desulfurization zone.

References Cited in the file of this patent

UNITED STATES PATENTS

| | | |
|---|---|---|
| 2,763,358 | Linn et al. | Sept. 18, 1956 |
| 2,773,008 | Hengstebeck | Dec. 4, 1956 |
| 2,833,698 | Patton et al. | May 6, 1958 |
| 2,951,032 | Inwood | Aug. 30, 1960 |